(12) United States Patent
Nishikawa et al.

(10) Patent No.: US 11,479,476 B2
(45) Date of Patent: Oct. 25, 2022

(54) ZIRCONIA SOL AND METHOD FOR MANUFACTURING SAME

(71) Applicant: DAIICHI KIGENSO KAGAKU KOGYO CO., LTD., Osaka (JP)

(72) Inventors: Taku Nishikawa, Osaka (JP); Taichi Kunisada, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 894 days.

(21) Appl. No.: 16/330,114

(22) PCT Filed: Nov. 28, 2017

(86) PCT No.: PCT/JP2017/042625
§ 371 (c)(1),
(2) Date: Mar. 4, 2019

(87) PCT Pub. No.: WO2018/116762
PCT Pub. Date: Jun. 28, 2018

(65) Prior Publication Data
US 2019/0233300 A1 Aug. 1, 2019

(30) Foreign Application Priority Data
Dec. 22, 2016 (JP) ............................. JP2016-249793

(51) Int. Cl.
*C01G 25/02* (2006.01)
*B01J 13/00* (2006.01)

(52) U.S. Cl.
CPC .......... *C01G 25/02* (2013.01); *B01J 13/0047* (2013.01); *C01P 2002/72* (2013.01); *C01P 2002/82* (2013.01); *C01P 2004/64* (2013.01); *C01P 2006/22* (2013.01)

(58) Field of Classification Search
CPC ............................. C01G 25/02; B01J 13/0047
See application file for complete search history.

(56) References Cited

U.S. PATENT DOCUMENTS

2016/0096738 A1  4/2016  Chiang et al.
2017/0306161 A1  10/2017 Morita et al.

FOREIGN PATENT DOCUMENTS

| CN | 1623905 A | 6/2005 |
|---|---|---|
| JP | H05170442 A | 7/1993 |
| JP | 2008031023 A | 2/2008 |
| JP | 5011695 B | 8/2012 |
| JP | 5019826 B2 | 9/2012 |
| JP | 2014080361 A | 5/2014 |
| JP | 5794275 B2 | 10/2015 |
| KR | 20090003140 A | 1/2009 |
| WO | 2016035689 A1 | 3/2016 |

OTHER PUBLICATIONS

Extended European Search Report from EP 17885306.5, dated Mar. 27, 2020.
PCT International Preliminary Report on Patentability from PCT/JP2017/042625, dated Jun. 25, 2019.

*Primary Examiner* — James A Fiorito
(74) *Attorney, Agent, or Firm* — SZDC Law P.C.

(57) ABSTRACT

Provided are a zirconia sol having a transmittance of 45% or more at a wavelength of 400 nm, having a transmittance of 75% or more at a wavelength of 550 nm, and containing zirconia particles in an amount of 20 wt % or more, and a method for manufacturing the zirconia sol.

10 Claims, 2 Drawing Sheets

ZIRCONIA SOL AND METHOD FOR MANUFACTURING SAME

This application is the National Stage Application of PCT/JP2017/042625, filed on Nov. 28, 2017, which claims priority to Japanese Patent Application No.: 2016-249793, filed on Dec. 22, 2016, which is incorporated by reference for all purposes as if fully set forth herein.

TECHNICAL FIELD

The present invention relates to highly transparent zirconia sol and a method for manufacturing the same.

BACKGROUND ART

Various attempts have been made to increase the refractive index and mechanical properties of resin by combining, as a filler, zirconium oxide with resin or the like. Among these composite materials, zirconia sol obtained by dispersing zirconium oxide in a solvent is suitably used in optical applications, and in order to suppress a decrease in transparency of resin and increase the refractive index of resin, in particular, there is strong demand for the development of highly transparent zirconia sol.

Patent Document 1 proposes zirconia sol containing an alkali metal oxide ($M_2O$, M indicates an alkali metal) in an $M_2O/ZrO_2$ mole ratio of $0.2 \times 10^{-2}$ or more and in which zirconia has a tetragonal and/or cubic crystal lattice structure. Although there is no description regarding transparency, the sol has an average particle size $D_{50}$ of 17 nm, and it cannot be said that this sol has sufficient transparency.

Although Patent Document 2 proposes a zirconia sol having a transmittance of 35% or more at a wavelength of 400 nm, a transmittance of 95% or more at a wavelength of 800 nm, and containing zirconium oxide particles in an amount of 20% by weight or more, it cannot be said that this sol has sufficient transparency, and a method for manufacturing the same requires a reaction at a high temperature of 180° C. or more, and thus it is problematic in that special equipment is required.

Patent Document 3 proposes a zirconia sol containing tetragonal zirconia particles having a dispersed particle size of 1 nm or more and 20 nm or less, and discloses that, with regard to transparency, when this zirconia sol contains zirconia particles in an amount of 5% by mass and an optical path length is 10 mm, the visible light transmittance is 90% or more. However, when the concentration is higher than 5%, of course, the transparency decreases, and thus it cannot be said that this sol has sufficient transparency. Also, a method for manufacturing the same includes adding a dispersion medium and a dispersant to zirconia obtained through firing at 500° C. or more, and dispersing zirconia, and thus a large amount of dispersant is required. A dispersant reduces the refractive index of the sol, and thus is not preferable in high refractive index applications.

PRIOR ART DOCUMENTS

Patent Documents

Patent Document 1: Japanese Patent No. 5019826
Patent Document 1: Japanese Patent No. 5794275
Patent Document 1: Japanese Patent No. 5011695

DISCLOSURE OF THE INVENTION

Problem to be Solved by the Invention

The present invention has resolved the above-described issues, and an object of the present invention is to provide a highly transparent zirconia sol that has a high concentration of zirconia particles and high transparency, and can be suitably used in optical applications, and an inexpensive method for manufacturing the same.

Means for Solving Problem

A zirconia sol according to the present invention has a transmittance of 45% or more at a wavelength of 400 nm, has a transmittance of 75% or more at a wavelength of 550 nm, and contains zirconia particles in an amount of 20 wt % or more.

Preferably, the zirconia sol according to the present invention has a transmittance of 50% or more at a wavelength of 400 nm, and has a transmittance of 80% or more at a wavelength of 550 nm.

Preferably, the zirconia sol according to the present invention contains an alkali metal oxide ($M_2O$, M indicates an alkali metal) with respect to zirconia in an $M_2O/ZrO_2$ mole ratio of $0.02 \times 10^{-2}$ or more and $0.4 \times 10^{-2}$ or less.

Preferably, the zirconia sol according to the present invention contains sodium oxide in a $Na_2O/ZrO_2$ mole ratio of $0.02 \times 10^{-2}$ or more and $0.4 \times 10^{-2}$ or less where the alkali metal M is Na.

Preferably, the zirconia sol according to the present invention contains lithium oxide in a $Li_2O/ZrO_2$ mole ratio of $0.02 \times 10^{-2}$ or more and $0.4 \times 10^{-2}$ or less where the alkali metal M is Li.

Preferably, the zirconia sol according to the present invention has a haze value of 12% or less.

Preferably, the zirconia sol according to the present invention has an average particle size of 10 nm or less.

Preferably, the zirconia sol according to the present invention includes a monoclinic phase and a tetragonal phase as a crystal phase of zirconia.

In the zirconia sol according to the present invention, a dispersion medium preferably contains aliphatic alcohols, polyhydric alcohols, aliphatic ketones, or a mixture of two or more of aliphatic alcohols, polyhydric alcohols, and aliphatic ketones.

A method for manufacturing a zirconia sol include a first step of heating an alkali metal solution to 60° C. or more, a second step of adding ⅓ to ⅔ of a defined addition amount of a zirconium salt solution to the solution obtained in the first step, a third step of aging the solution obtained in the second step at a predetermined temperature, and a fourth step of adding the remaining portion of the zirconium salt solution used in the second step to the solution obtained in the third step and producing zirconium hydroxide.

Effects of Invention

The inventor of the present invention found that according to the above-described composition, it is possible to obtain a highly transparent zirconia sol with high transparency. In particular, the inventor found that, as a result of adding an alkali metal oxide ($M_2O$, M indicates an alkali metal) to zirconia ($ZrO_2$) particles in the zirconia sol in an $M_2O/ZrO_2$ mole ratio of $0.02 \times 10^{-2}$ or more and $0.4 \times 10^{-2}$ or less and optimizing a zirconia hydrolysis condition, the transparency of the zirconia sol significantly increases even if the concentration of zirconia particles is high, and thus the inventor reached the present invention.

A highly transparent zirconia sol obtained in the present invention can be suitably used in filler applications of optical films, in particular. Even if the zirconia sol according to the present invention is added to resin at a high concentration, a decrease in the transparency of the resin is suppressed. Thus, it is possible to achieve an increase in the refractive index of various resins and maintain high transparency of these resins.

A manufacturing method according to the present invention is not conducted under special conditions such as a hydrothermal reaction, and thus the production cost can be reduced, and this manufacturing method can be suitably used in the optical field due to a high production efficiency.

BEST MODE FOR CARRYING OUT THE INVENTION

Hereinafter, a zirconia sol of the present invention and a method for manufacturing the same will be described in detail.

Zirconia Sol

A zirconia sol according to the present invention contains one or more alkali metal oxides ($M_2O$, M indicates an alkali metal) in zirconia ($ZrO_2$), which is a dispersoid, in an $M_2O/ZrO_2$ mole ratio of $0.02 \times 10^{-2}$ or more and $0.4 \times 10^{-2}$ or less, and more preferably $0.025 \times 10^{-2}$ or more and $0.3 \times 10^{-2}$ or less.

It is thought that an alkali metal oxide ($M_2O$, M indicates an alkali metal) is ultimately incorporated into zirconia ($ZrO_2$), which is a dispersoid, due to a portion of $Zr^{4+}$ of zirconium hydroxide being substituted with W (M indicates an alkali metal) at a stage where a zirconium salt solution is added in a divided manner to an alkali metal hydroxide solution that has been heated to 60° C. or more, preferably 70° C. or more, and zirconium hydroxide is produced (reverse neutralization). Thus, alkali metal oxide mostly remains even when subjected to washing with water, pickling, or the like.

Note that examples of an aqueous solution of an alkali metal hydroxide used as a neutralizer for zirconium salt include an aqueous solution of lithium hydroxide, an aqueous solution of sodium hydroxide, an aqueous solution of potassium hydroxide, an aqueous solution of rubidium hydroxide, and an aqueous solution of cesium hydroxide, and a solution obtained by mixing these aqueous solutions can also be used. Although there is no particular limitation on an alkali metal oxide ($M_2O$, M indicates an alkali metal) included in zirconia ($ZrO_2$), which is a dispersoid, in the present invention, normally, $Na_2O$, $Li_2O$, $K_2O$, and the like can be suitably used.

Figure 1:
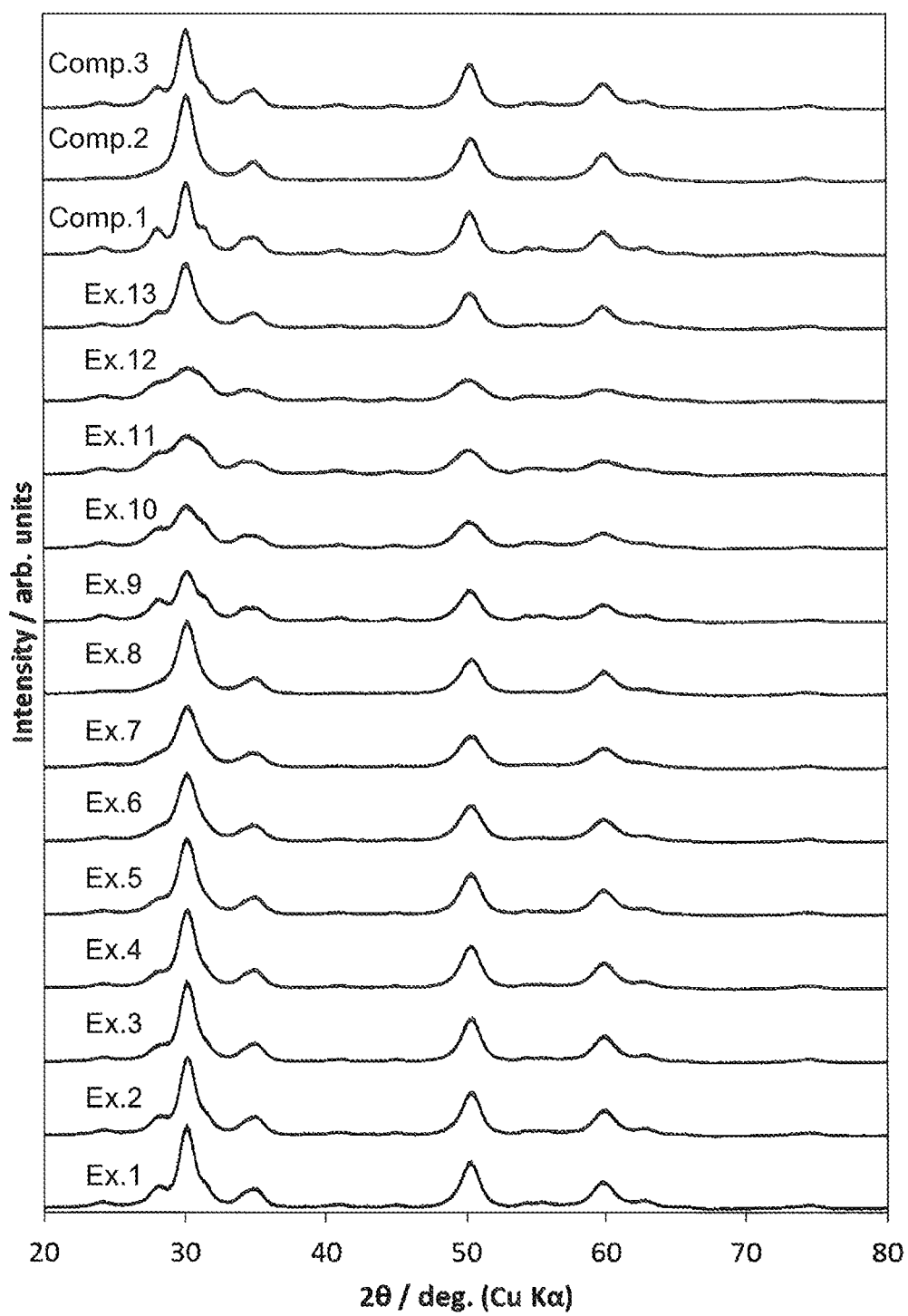
FIG. 1 shows XRD spectra of dried zirconia sols of Examples and Comparative Examples.
Figure 2:
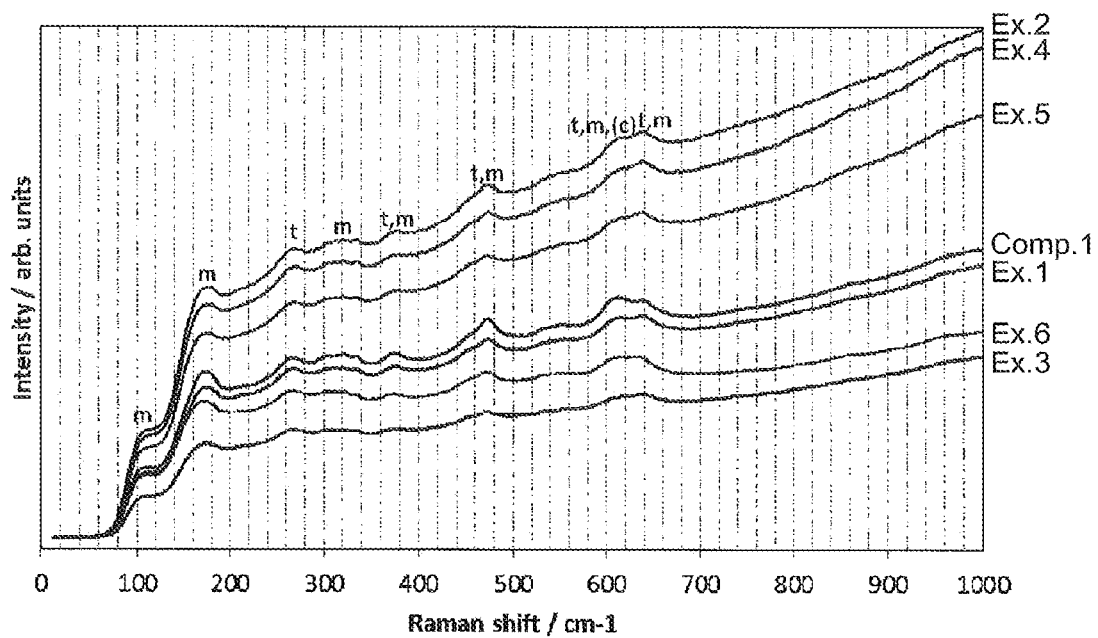
FIG. 2 shows Raman spectra of dried zirconia sols of Examples and Comparative Examples.

Preferably, the zirconia sol according to the present invention has monoclinic and tetragonal crystal lattice structures as a crystal phase of zirconia. More preferably, the crystal phase of zirconia is constituted by monoclinic and tetragonal crystal lattice structures. It is thought that the reason as to why the tetragonal phase is formed is that an alkali metal oxide is incorporated into zirconia ($ZrO_2$) that is a dispersoid as described above, and plays the role of a so-called "stabilizing agent". XRD spectra of dried zirconia sols of Examples 1 to 13 and Comparative Examples 1 to 3, which will be described later, are shown in FIG. 1. Also, Raman spectra of Examples 1 to 6 and Comparative Example 1 are shown in FIG. 2.

It is preferable that the zirconia sol of the present invention contains particles having a monoclinic crystal structure and particles having a tetragonal crystal structure in a certain ratio. It is not preferable that the zirconia sol contains an excessively large or small number of particles having either one of the crystal structures because the transparency of the zirconia sol decreases. Although details of the principle are unclear, it is thought that monoclinic particles have a larger aspect ratio than tetragonal particles, and are more likely to scatter light, and thus if the ratio of monoclinic particles is excessively large, the transparency decreases. On the other hand, it is thought that tetragonal particles have a square-like shape and tend to come close to each other, and thus if the ratio of tetragonal particles is excessively large, light is unlikely to pass through the zirconia sol and the transparency decreases.

A peak intensity ratio of peaks assigned to each crystal structure in XRD spectra can be used as a reference of the abundance ratio between particles having a monoclinic crystal structure and particles having a tetragonal crystal structure. In the XRD spectra, when the peak intensity of a peak assigned to a monoclinic crystal near 28.1 degrees is m and the peak intensity of a peak assigned to a tetragonal crystal near 30.1 degrees is t, if Na is used as an alkali metal (if an alkali metal oxide is $Na_2O$), the ratio of t in the zirconia sol of the present invention (a $t/(t+m)$ value) is preferably 0.75 or more and 0.95 or less, and more preferably 0.78 or more and 0.90 or less. It is not preferable that the $t/(t+m)$ value is less than 0.75 because the ratio of particles that have a monoclinic structure is high and the transparency of the zirconia sol decreases, and it is not preferable that the $t/(t+m)$ value exceeds 0.95 because the ratio of particles that have a tetragonal structure is high and the transparency of the zirconia sol decreases. Note that, if Li is used as an alkali metal (if an alkali metal oxide is $Li_2O$), even if the ratio of t in the zirconia sol (the $t/(t+m)$ value) is in a range of 0.61 to 0.70, a highly transparent zirconia sol can be obtained (see Examples 9 to 12, which will be described later).

Note that, although peaks appearing near 30.1 degrees in the XRD spectra shown in FIG. 1 can be assigned to a cubic crystal, these peaks appearing near 30.1 are understood as peaks assigned to a tetragonal crystal, because a peak appearing near 74 degrees which is assigned to a cubic crystal does not exist. That is, it is understood that the crystal phase of the zirconia is constituted by monoclinic and tetragonal crystal lattice structures. Also, it is understood that the crystal phase of the zirconia is constituted by monoclinic and tetragonal crystal lattice structures because a peak appearing at 625 $cm^{-1}$ in the Raman spectra shown in FIG. 2 which is assigned to a cubic crystal does not exist.

Regarding the alkali metal oxide ($M_2O$, M indicates an alkali metal), one or more alkali metal oxides ($M_2O$, M indicates an alkali metal) are contained in zirconia ($ZrO_2$), which is a dispersoid, in an $M_2O/ZrO_2$ mole ratio of $0.02 \times 10^{-2}$ or more and $0.4 \times 10^{-2}$ or less, and more preferably $0.025 \times 10^{-2}$ or more and $0.3 \times 10^{-2}$ or less.

It is not preferable that the $M_2O/ZrO_2$ mole ratio is less than $0.02 \times 10^{-2}$ because the transparency of the zirconia sol decreases. Similarly, it is not preferable that the $M_2O/ZrO_2$ mole ratio exceeds $0.4 \times 10^{-2}$ because the transparency of the zirconia sol decreases.

The particle size of the zirconia sol of the present invention was measured using a Zetasizer Nano (manufactured by Spectris Co., Ltd.). The zirconia sol of the present invention preferably has an average particle size $D_{50}$ of 2 nm or more and 10 nm or less, more preferably 2 nm or more and 5 nm or less, and preferably has an average particle size $D_{90}$ of 15 nm or less, and more preferably 10 nm or less, and preferably has an average particle size $D_{99}$ of 30 nm or less. It is not preferable that the average particle size is less than 2 nm because it is difficult to purify and concentrate the zirconia sol, and that the average particle size exceeds 10 nm because the transparency of the zirconia sol decreases. Also, it is not preferable that $D_{99}$ exceeds 30 nm because the transparency of the zirconia sol decreases, and when the zirconia sol is used as an organic filler and formed into a film, the transparency is impaired because $D_{99}$ is not sufficiently smaller than the wavelength in a visible light region.

On the other hand, the concentration of the zirconia sol of the present invention is not particularly limited, and normally, the concentration is 10 to 50% in terms of $ZrO_2$. It is not preferable that the concentration of the zirconia sol is less than 10% because when the zirconia sol is diluted using another solvent, the concentration of the zirconia decreases, and it is not preferable that the concentration of the zirconia exceeds 50% because the stability is impaired due to an increase in the viscosity of the sol.

There is no particular limitation on the dispersion medium of the zirconia sol of the present invention, and examples thereof include aliphatic alcohols, polyhydric alcohols, and aliphatic ketones, or a mixture of two or more of aliphatic alcohols, polyhydric alcohols, and aliphatic ketones. Preferably, normally water (pure water or ion exchanged water, and the same applies to the following description hereinafter) is used. Note that there is no particular limitation on the pH of the dispersion medium.

The zirconia sol of the present invention has a transmittance of 45% or more, preferably 50% or more, and more preferably 53% or more, at a wavelength of 400 nm. The zirconia sol of the present invention has a transmittance of 75% or more, preferably 80% or more, and more preferably 85% or more, at a wavelength of 550 nm. The zirconia sol of the present invention preferably has a transmittance of 85% or more, more preferably 90% or more, and particularly preferably 95% or more, at a wavelength of 800 nm. In particular, the zirconia sol of the present invention is characterized by having high transmittance at a wavelength of 400 nm.

If the alkali metal M is Li, the zirconia sol of the present invention in particular has a transmittance of 50% or more, preferably 53% or more, and more preferably 60% or more, at a wavelength of 400 nm. The zirconia sol of the present invention has a transmittance of 80% or more, preferably 83% or more, and more preferably 88% or more, at a wavelength of 550 nm. The zirconia sol of the present invention preferably has a transmittance of 90% or more, more preferably 93% or more, and particularly preferably 96% or more, at a wavelength of 800 nm. In particular, the zirconia sol of the present invention is characterized by having high transmittance at a wavelength of 400 nm.

The zirconia sol of the present invention preferably has a haze value of 12% or less, more preferably 10% or less, and particularly preferably 9% or less. If the haze value exceeds 12%, the zirconia sol has poor transparency, and the zirconia sol may not be suitably utilized in an optical material or the like. Note that the haze value and the transmittance in this specification are values obtained through measurement using an ultraviolet and visible spectrophotometer UV-2400PC (manufactured by SHIMADZU CORPORATION). The wavelength at which haze was measured was set to 550 nm.

Method for Manufacturing Zirconia Sol

Hereinafter, a method for manufacturing the zirconia sol of the present invention will be described in detail.

The method for manufacturing the zirconia sol of the present invention includes a first step of heating one or more alkali metal solutions to 60° C. or more, a second step of adding a zirconium salt solution to the alkali metal solutions obtained in the first step, a third step of aging the liquid obtained in the second step at a predetermined temperature, and a fourth step of adding the remaining portion of the zirconium salt solution used in the second step to the solution obtained in the third step and producing zirconium hydroxide. Also, preferably, the method includes a step of, after zirconium hydroxide obtained through the first to fourth steps is dispersed in water, adding acid, and peptizing zirconium hydroxide through heating and aging.

In the first step, the alkali metal solution, which is a neutralizer for zirconium salt, is heated to 60° C. or more, and preferably 70° C. or more. There is no particular limitation on the alkali metal hydroxide solution as long as it is an aqueous solution of an alkali metal hydroxide, and examples thereof include an aqueous solution of lithium hydroxide, an aqueous solution of sodium hydroxide, an aqueous solution of potassium hydroxide, an aqueous solution of rubidium hydroxide, and an aqueous solution of cesium hydroxide, and normally, lithium hydroxide, sodium hydroxide, and potassium hydroxide that are industrially used can be suitably used. Also, a solution obtained by mixing these aqueous solutions can be used.

Note that, although there is no particular limitation on the upper limit of the temperature at which an aqueous solution of an alkali metal hydroxide is heated, if possible, the heating temperature is preferably 100° C. or less because a special reaction container or the like is not required.

It is preferable that alkali metal hydroxides (M indicates Li, Na, K, Rb, and Cs), which are neutralizers, satisfy MOH (in terms of 100%)/$ZrO_2$ (mole ratio)=2 or more. It is not appropriate that MOH (in terms of 100%)/$ZrO_2$ is less than 2 because neutralization of an aqueous solution of zirconium salt will not be complete. Although there is no particular limitation on the upper limit, normally, MOH (in terms of 100%)/$ZrO_2$ (mole ratio) is 2.5 or more, and preferably 3.0 or more. Note that, it is not economical if MOH/$ZrO_2$ exceeds 15.

Also, there is no particular limitation on the concentration of an aqueous solution of alkali metal hydroxides used as the neutralizer, normally, an aqueous solution of alkali metal hydroxides having a concentration of 5 to 25% by weight is used. It is not economically preferable that the concentration thereof is less than 5% by weight because a large amount of water is required to dilute alkali metals. Also, it is not preferable that the concentration thereof exceeds 25% by weight because it is difficult to obtain a homogeneous solution of alkali metal hydroxides due to the risk of recrystallization at the solubility of an alkali metal.

With the method for manufacturing the zirconia sol of the present invention, in the second step, zirconium hydroxide is produced by adding a zirconium salt solution in a divided manner to an alkali metal hydroxide solution. That is, ⅓ to ⅔, or preferably ½, of a required defined amount of a zirconium salt solution (the total amount of the zirconium salt solution added in the second and fourth steps) is added, as a first addition amount, to the alkali metal hydroxide solution obtained in the first step.

Although there is no particular limitation on a zirconium salt used in the present invention as long as it is water soluble and examples thereof include nitrates, sulfates, acetates, and chlorides, nitrates and chlorides are preferable because impurities are unlikely to be introduced in the subsequent steps.

The concentration of zirconium in the zirconium salt solution is preferably 5 to 50% by weight, more preferably 10 to 35% by weight, and particularly preferably 15 to 30% by weight, in terms of $ZrO_2$. It is not preferable that the concentration thereof is less than 5% by weight because the production efficiency is low, and that the concentration thereof exceeds 50% by weight because it is difficult to perform stirring due to the high viscosity of the neutralized zirconium salt, and hydroxides are ununiformly produced and filterability is poor.

In the third step, the solution obtained in the second step is subjected to aging with the solution kept at a predetermined temperature. Although there is no particular limitation on the predetermined temperature, the temperature of the alkali metal hydroxide solution at which the zirconium salt solution is added in the second step is preferable. Although there is no particular limitation on a temperature keeping time, preferably, the temperature keeping time is 10 minutes or more and less than 2 hours after addition of the zirconium salt solution is completed in the second step. If the temperature keeping time is less than or equal to 10 minutes, a desired reaction is not sufficiently facilitated, and if the temperature keeping time is more than or equal to 2 hours, the reaction is facilitated but the manufacturing time increases, resulting in extra cost.

In the fourth step, the remaining portion of the zirconium salt solution is added to the solution obtained after the third step is complete (that is, the solution after the above-described temperature keeping time has passed after addition of the zirconium salt solution was completed in the second step). Although details of the principle are unclear, substitution of $Zr^{4+}$ in zirconium hydroxide with W is desirably facilitated in this step, and as a result, the transmittance, haze, the crystal phase, and the average particle size of the present invention are achieved.

In particular, it is thought that, as a result of adding an aqueous solution of zirconium salt in a divided manner to an aqueous solution of heated alkali metal hydroxides to neutralize zirconium salt, the aqueous solution of heated alkali metal hydroxides (MOH) and the aqueous solution of zirconium salt moderately react with each other, alkali metals are incorporated in the structure of zirconium hydroxide, instead of the alkali metals being adsorbed on the surface of zirconium hydroxide, and as a result of portions of $Zr^{4+}$ of zirconium hydroxide being substituted with $M^+$, a highly transparent zirconia sol having monoclinic and tetragonal crystal lattices can be obtained.

Note that the pH of a zirconium hydroxide dispersion used to perform neutralization is preferably 7.0 or more, and more preferably 10.0 or more. It is not preferable that the pH thereof is less than 7.0 because a neutralization reaction does not sufficiently proceed. Water is added to wet cake containing zirconium hydroxide manufactured through the above-described first to fourth steps to prepare a zirconium hydroxide dispersion with 5 to 20% by weight in terms of $ZrO_2$, and acid is added as a peptizing agent. It is not economical from the viewpoint of production efficiency if the concentration of the zirconium hydroxide dispersion is less than 5% by weight, and if the concentration thereof exceeds 20% by weight, the concentration of metal ions is high and thus it is difficult to perform peptization.

Although there is no particular limitation on the peptizing agent for zirconium hydroxide as long as it is a water-soluble inorganic acid or organic acid, and examples thereof include hydrochloric acid, nitric acid, sulfuric acid, acetic acid, lactic acid, citric acid, tartaric acid, malic acid, and mandelic acid, hydrochloric acid and nitric acid are preferable because, even if a zirconia sol contains excessive amounts of these acids, these acids can be easily removed through purification using water after the zirconia sol is produced.

$Acid/ZrO_2$ (mole ratio) is preferably 0.01 to 3, and more preferably 0.1 to 1.5 as the amount of a peptizing agent to be added. If $acid/ZrO_2$ (mole ratio) is less than 0.01, zirconium hydroxide is insufficiently peptized, and thus the zirconia sol cannot be manufactured. Also, if $acid/ZrO_2$ (mole ratio) exceeds 3, the peptizing agent has little quantitative effect, which is not economical.

Next, when zirconium hydroxide is peptized, heating and aging are performed preferably at 80° C. or more, and more preferably at 90° C. or more. A time period for which heating and aging are performed is preferably 24 hours or more, and more preferably 48 hours or more. From the viewpoint of yield, it is not preferable that the temperature is less than 80° C. because zirconium hydroxide is not peptized and remains as precipitate, and it is not preferable that the time period is less than 24 hours because zirconium hydroxide similarly remains as hydroxide precipitate. Note that use of a pressurizing apparatus such as an autoclave in heating and aging makes it possible to shorten heating and aging time period.

The end of reaction can be visually confirmed because the solution turns a uniform transparent light blue. The solution containing the zirconia sol manufactured in this manner is preferably purified and concentrated through ultrafiltration after the solution is cooled to room temperature. Note that the pH may be changed using an acid or an alkaline solution before or after ultrafiltration is performed.

Acid that has been excessively added can be easily removed through ultrafiltration, and with regard to alkali metals that can be thought to contribute to the stabilization of the tetragonal crystal lattice of zirconia, alkali metals adsorbed on the surface of zirconia can also be removed.

EXAMPLES

Examples will be described below, and the present invention will be specifically described. However, the present invention is not limited by these Examples. Zirconia nanoparticles obtained in Examples and Comparative Examples contain, as inevitable impurities, hafnium oxide in an amount of 1.3 to 2.5% by weight with respect to zirconium oxide.

The amount of $Na_2O$ and the amount of $Li_2O$ in sol were measured using an atomic absorption photometer (Z-2300 manufactured by Hitachi High-Technologies Corporation). A quartz cell having an optical path length of 10 mm was filled with sol, and the transmittance and haze were measured using an ultraviolet and visible spectrophotometer (UV-2400 manufactured by SHIMADZU CORPORATION). The particle size was measured using a Zetasizer Nano ZS (manufactured by Spectris Co., Ltd.). Also, XRD spectra were measured using RINT 2500 (manufactured by Rigaku Corporation, an X-ray source was CuKα), a t/(t+m) value indicating a ratio oft was calculated from a peak intensity (m) of a peak assigned to a monoclinic crystal near 28.1 degrees and a peak intensity (t) of a peak assigned to a tetragonal crystal near 30.1 degrees. Note that, as is clear from FIG. 1, it is understood that, in all of the Examples and comparative examples, no peak assigned to a cubic crystal is present near 74 degrees, and thus the peak near 30.1 degrees is a peak assigned to a tetragonal crystal. That is, it is understood that the crystal phase of zirconia is constituted by monoclinic and tetragonal crystal lattice structures. Also, Raman spectra were measured using a laser Raman spectrophotometer NRS-4100 (manufactured by JASCO Corporation), and the measurement wavelength was set to 457 nm.

Example 1

A solution (Solution a) was prepared by diluting 593.2 g of a zirconium oxychloride solution (manufactured by DAIICHI KIGENSO KAGAKU KOGYO CO., LTD.) (containing 120.0 g of $ZrO_2$) using 606.8 g of pure water. Also, 1050.0 g of a 10% aqueous solution of sodium hydroxide (Solution b) was warmed to 70° C. First, 600.0 g of Solution a was added to Solution b, and aging was performed for 30 minutes. Then, the remaining 600.0 g of Solution a was further added thereto, and aging was performed for 90 minutes. After the resulting solution was cooled to room temperature, filtration and washing were performed to obtain 655.7 g of wet cake. After 546.2 g of this wet cake was dispersed in 454.8 g of pure water, 19.4 g of 60% nitric acid (manufactured by Sigma-Aldrich Japan) was added. Then, the resulting solution was warmed to 100° C., aging was performed for 96 hours, and 1002.0 g of a zirconia sol was obtained. The obtained zirconia sol had a solid concentration of 9.7%, and had a pH of 1.2. The pH was adjusted to 9.0 by adding 20.0 g of anhydrous citric acid (manufactured by KISHIDA CHEMICAL Co., Ltd.) and 37.8 g of 25% aqueous ammonia to 827.3 g of this zirconia sol. Then, purification and concentration were repeated through ultrafiltration until the pH reached 7.2, and thus a zirconia sol containing zirconia as $ZrO_2$ in an amount of 30% by weight was obtained. The weight ratio of $Na_2O$ to $ZrO_2$ in the zirconia sol was 0.017%, and the mole ratio of $Na_2O$ to $ZrO_2$ was $0.034\times10^{-2}$. Also, the transmittance was 50.2% at a wavelength of 400 nm, and the transmittance was 81.3% at a wavelength of 550 nm.

Example 2

Processing was performed in steps similar to those of Example 1 to obtain a zirconia sol, except that the amount of the 10% sodium hydroxide solution was 1200.0 g. The weight ratio of $Na_2O$ to $ZrO_2$ in the zirconia sol was 0.045%, and the mole ratio of $Na_2O$ to $ZrO_2$ was $0.089\times10^{-2}$. Also, the transmittance was 55.3% at a wavelength of 400 nm, and the transmittance was 85.7% at a wavelength of 550 nm.

Example 3

Processing was performed in steps similar to those of Example 1 to obtain a zirconia sol, except that the amount of the 10% sodium hydroxide solution was 1350.0 g. The weight ratio of $Na_2O$ to $ZrO_2$ in the zirconia sol was 0.066%, and the mole ratio of $Na_2O$ to $ZrO_2$ was $0.131\times10^{-2}$. Also, the transmittance was 53.3% at a wavelength of 400 nm, and the transmittance was 87.1% at a wavelength of 550 nm.

Example 4

Processing was performed in steps similar to those of Example 1 to obtain a zirconia sol, except that the amount of the 10% sodium hydroxide solution was 1500.0 g. The weight ratio of $Na_2O$ to $ZrO_2$ in the zirconia sol was 0.072%, and the mole ratio of $Na_2O$ to $ZrO_2$ was $0.143\times10^{-2}$. Also, the transmittance was 59.8% at a wavelength of 400 nm, and the transmittance was 88.4% at a wavelength of 550 nm.

Example 5

Processing was performed in steps similar to those of Example 1 to obtain a zirconia sol, except that the amount of the 10% sodium hydroxide solution was 1650.0 g. The weight ratio of $Na_2O$ to $ZrO_2$ in the zirconia sol was 0.088%, and the mole ratio of $Na_2O$ to $ZrO_2$ was $0.175\times10^{-2}$. Also, the transmittance was 62.2% at a wavelength of 400 nm, and the transmittance was 89.3% at a wavelength of 550 nm.

Example 6

Processing was performed in steps similar to those of Example 1 to obtain a zirconia sol, except that the amount of the 10% sodium hydroxide solution was 2100.0 g. The weight ratio of $Na_2O$ to $ZrO_2$ in the zirconia sol was 0.112%, and the mole ratio of $Na_2O$ to $ZrO_2$ was $0.223\times10^{-2}$. Also, the transmittance was 69.1% at a wavelength of 400 nm, and the transmittance was 89.5% at a wavelength of 550 nm.

Example 7

Processing was performed in steps similar to those of Example 1 to obtain a zirconia sol, except that the amount of the 10% sodium hydroxide solution was 3000.0 g. The weight ratio of $Na_2O$ to $ZrO_2$ in the zirconia sol was 0.153%, and the mole ratio of $Na_2O$ to $ZrO_2$ was $0.304\times10^{-2}$. Also, the transmittance was 66.5% at a wavelength of 400 nm, and the transmittance was 87.3% at a wavelength of 550 nm.

Example 8

Processing was performed in steps similar to those of Example 1 to obtain a zirconia sol, except that the amount of the 10% sodium hydroxide solution was 4500.0 g. The weight ratio of $Na_2O$ to $ZrO_2$ in the zirconia sol was 0.195%, and the mole ratio of $Na_2O$ to $ZrO_2$ was $0.388\times10^{-2}$. Also, the transmittance was 56.4% at a wavelength of 400 nm, and the transmittance was 80.1% at a wavelength of 550 nm.

Example 9

Processing was performed in steps similar to those of Example 1 to obtain a zirconia sol, except that a lithium hydroxide solution was used instead of a sodium hydroxide solution and the amount of a 10% lithium hydroxide solution was 600.0 g. The weight ratio of $Li_2O$ to $ZrO_2$ in this sol was 0.007%, and the mole ratio of $Li_2O$ to $ZrO_2$ was $0.029\times10^{-2}$. Also, the transmittance was 50.1% at a wavelength of 400 nm, and the transmittance was 82.9% at a wavelength of 550 nm.

Example 10

Processing was performed in steps similar to those of Example 9 to obtain a zirconia sol, except that the amount of the 10% lithium hydroxide solution was 900.0 g. The weight ratio of $Li_2O$ to $ZrO_2$ in this sol was 0.013%, and the mole ratio of $Li_2O$ to $ZrO_2$ was $0.054\times10^{-2}$. Also, the transmittance was 68.0% at a wavelength of 400 nm, and the transmittance was 90.2% at a wavelength of 550 nm.

Example 11

Processing was performed in steps similar to those of Example 9 to obtain a zirconia sol, except that the amount of the 10% lithium hydroxide solution was 1800.0 g. The weight ratio of $Li_2O$ to $ZrO_2$ in this sol was 0.016%, and the mole ratio of $Li_2O$ to $ZrO_2$ was $0.066\times10^{-2}$. Also, the transmittance was 74.0% at a wavelength of 400 nm, and the transmittance was 93.0% at a wavelength of 550 nm.

Example 12

Processing was performed in steps similar to those of Example 9 to obtain a zirconia sol, except that the amount of the 10% lithium hydroxide solution was 3500.0 g. The weight ratio of $Li_2O$ to $ZrO_2$ in this sol was 0.042%, and the mole ratio of $Li_2O$ to $ZrO_2$ was $0.173 \times 10^{-2}$. Also, the transmittance was 70.7% at a wavelength of 400 nm, and the transmittance was 88.6% at a wavelength of 550 nm.

Example 13

Processing was performed in steps similar to those of Example 6 to obtain a zirconia sol, except that 35% hydrochloric acid (manufactured by Sigma-Aldrich Japan) was used as acid added during peptization, instead of 60% nitric acid, and the addition amount of 35% hydrochloric acid was 17.4 g. The weight ratio of $Na_2O$ to $ZrO_2$ in the zirconia sol was 0.097%, and the mole ratio of $Na_2O$ to $ZrO_2$ was $0.193 \times 10^{-2}$. Also, the transmittance was 54.5% at a wavelength of 400 nm, and the transmittance was 82.9% at a wavelength of 550 nm.

Comparative Example 1

Processing was performed in steps similar to those of Example 1 to obtain a zirconia sol, except that the amount of the 10% sodium hydroxide solution was 900.0 g. The weight ratio of $Na_2O$ to $ZrO_2$ in the zirconia sol was 0.010%, and the mole ratio of $Na_2O$ to $ZrO_2$ was $0.019 \times 10^{-2}$. Also, the transmittance was 27.2% at a wavelength of 400 nm, and the transmittance was 67.8% at a wavelength of 550 nm.

Comparative Example 2

Processing was performed in steps similar to those of Example 1 to obtain a zirconia sol, except that the amount of the 10% sodium hydroxide solution was 9000.0 g. The weight ratio of $Na_2O$ to $ZrO_2$ in the zirconia sol was 0.370%, and the mole ratio of $Na_2O$ to $ZrO_2$ was $0.736 \times 10^{-2}$. Also, the transmittance was 15.1% at a wavelength of 400 nm, and the transmittance was 40.0% at a wavelength of 550 nm.

Comparative Example 3

Processing was performed in steps similar to those of Example 2 to obtain a zirconia sol, except that 1200.0 g of Solution a was added without division. The weight ratio of $Na_2O$ to $ZrO_2$ in the zirconia sol was 0.043%, and the mole ratio of $Na_2O$ to $ZrO_2$ was $0.085 \times 10^{-2}$. Also, the transmittance was 43.6% at a wavelength of 400 nm, and the transmittance was 79.8% at a wavelength of 550 nm.

Analysis values such as the transmittance of the zirconia sols of the Examples, weight ratios and mole ratios of $M_2O$ to $ZrO_2$ are collectively listed in Tables 1 and 2, and analysis values such as the transmittance of the zirconia sols of the comparative examples, weight ratios and mole ratios of $M_2O$ to $ZrO_2$ are collectively listed in Table 3.

TABLE 1

| | Ex. 1 M = Na | Ex. 2 M = Na | Ex. 3 M = Na | Ex. 4 M = Na | Ex. 5 M = Na | Ex. 6 M = Na | Ex. 7 M = Na | Ex. 8 M = Na |
|---|---|---|---|---|---|---|---|---|
| $ZrO_2$ (wt %) | 30.3 | 30.3 | 30.2 | 30.3 | 30.2 | 30.6 | 30.4 | 30.2 |
| pH | 7.2 | 7.2 | 7.2 | 7.2 | 7.2 | 7.1 | 7.2 | 7.1 |
| Haze (%) | 9.2 | 8.0 | 7.1 | 7.2 | 7.7 | 7.0 | 7.0 | 8.9 |
| 400 nm Transmittance (%) | 50.2 | 55.3 | 53.3 | 59.8 | 62.2 | 69.1 | 66.5 | 56.4 |
| 550 nm Transmittance (%) | 81.3 | 85.7 | 87.1 | 88.4 | 89.3 | 89.5 | 87.3 | 80.1 |
| 800 nm Transmittance (%) | 95.2 | 96.2 | 95.2 | 96.6 | 96.7 | 95.2 | 95.6 | 90.3 |
| $D_{10}$ (nm) | 3.2 | 2.9 | 3.3 | 2.8 | 2.4 | 2.6 | 2.4 | 2.3 |
| $D_{50}$ (nm) | 4.9 | 4.2 | 4.6 | 3.9 | 3.4 | 3.5 | 3.5 | 3.3 |
| $D_{90}$ (nm) | 8.2 | 6.6 | 7.2 | 6.0 | 5.5 | 5.2 | 5.3 | 5.1 |
| $D_{99}$ (nm) | 22.2 | 17.4 | 21.8 | 18.4 | 15.9 | 17.0 | 17.1 | 16.9 |
| t/(t + m) | 0.77 | 0.79 | 0.79 | 0.80 | 0.79 | 0.79 | 0.80 | 0.83 |
| $M_2O/ZrO_2$ (wt %) | 0.017 | 0.045 | 0.066 | 0.072 | 0.088 | 0.112 | 0.153 | 0.195 |
| $M_2O/ZrO_2$ (mol %) | 0.034 | 0.089 | 0.131 | 0.143 | 0.175 | 0.223 | 0.304 | 0.388 |

TABLE 2

| | Ex. 9 M = Li | Ex. 10 M = Li | Ex. 11 M = Li | Ex. 12 M = Li | Ex. 13 M = Na |
|---|---|---|---|---|---|
| $ZrO_2$ (wt %) | 30.2 | 30.3 | 30.0 | 30.3 | 30.2 |
| pH | 7.2 | 7.1 | 7.2 | 7.2 | 7.2 |
| Haze (%) | 8.8 | 5.7 | 5.5 | 8.7 | 8.9 |
| 400 nm Transmittance (%) | 50.1 | 68.0 | 74.0 | 70.7 | 54.5 |
| 550 nm Transmittance (%) | 82.9 | 90.2 | 93.0 | 88.6 | 82.9 |
| 800 nm Transmittance (%) | 97.2 | 97.4 | 99.9 | 96.7 | 95.3 |
| $D_{10}$ (nm) | 3.3 | 2.5 | 2.5 | 3.4 | 2.7 |
| $D_{50}$ (nm) | 4.8 | 3.7 | 3.8 | 4.7 | 3.7 |
| $D_{90}$ (nm) | 9.6 | 8.7 | 8.0 | 8.7 | 6.1 |
| $D_{99}$ (nm) | 29.2 | 25.8 | 21.2 | 27.5 | 19.5 |
| t/(t + m) | 0.68 | 0.65 | 0.63 | 0.61 | 0.80 |
| $M_2O/ZrO_2$ (wt %) | 0.007 | 0.013 | 0.016 | 0.042 | 0.097 |
| $M_2O/ZrO_2$ (mol %) | 0.029 | 0.054 | 0.066 | 0.173 | 0.193 |

TABLE 3

|  | Comp. Ex. 1<br>M = Na | Comp. Ex. 2<br>M = Na | Comp. Ex. 3<br>M = Na |
|---|---|---|---|
| $ZrO_2$ (wt %) | 30.3 | 30.1 | 30.2 |
| pH | 7.3 | 7.2 | 7.2 |
| Haze (%) | 13.1 | 50.5 | 12.5 |
| 400 nm Transmittance (%) | 27.2 | 15.1 | 43.6 |
| 550 nm Transmittance (%) | 67.8 | 40.0 | 79.8 |
| 800 nm Transmittance (%) | 91.7 | 71.2 | 94.9 |
| $D_{10}$ (nm) | 3.7 | 5.3 | 3.4 |
| $D_{50}$ (nm) | 5.2 | 8.5 | 5.1 |
| $D_{90}$ (nm) | 8.3 | 15.2 | 8.6 |
| $D_{99}$ (nm) | 27.6 | 28.9 | 27.0 |
| t/(t + m) | 0.72 | 1.00 | 0.74 |
| $M_2O/ZrO_2$ (wt %) | 0.010 | 0.370 | 0.043 |
| $M_2O/ZrO_2$ (mol %) | 0.019 | 0.736 | 0.085 |

The invention claimed is:

1. A zirconia sol,
wherein the zirconia sol has a transmittance of 45% or more at a wavelength of 400 nm, has a transmittance of 75% or more at a wavelength of 550 nm, and contains zirconia particles in an amount of 20 wt % or more; and
wherein the zirconia sol contains an alkali metal oxide ($M_2O$, M indicates an alkali metal) with respect to zirconia in an $M_2O/ZrO_2$ mole ratio of $0.02 \times 10^{-2}$ or more and $0.4 \times 10^{-2}$ or less.

2. The zirconia sol according to claim 1,
wherein the zirconia sol has a transmittance of 50% or more at a wavelength of 400 nm, and has a transmittance of 80% or more at a wavelength of 550 nm.

3. The zirconia sol according to claim 1,
wherein the alkali metal M is Na.

4. The zirconia sol according to claim 1,
wherein the alkali metal M is Li.

5. The zirconia sol according to claim 1,
wherein the zirconia sol has a haze value of 12% or less.

6. The zirconia sol according to claim 1,
wherein the zirconia sol has an average particle size of 10 nm or less.

7. The zirconia sol according to claim 1,
wherein the zirconia sol includes a monoclinic phase and a tetragonal phase as a crystal phase of zirconia.

8. The zirconia sol according to claim 1,
wherein a dispersion medium contains aliphatic alcohols, polyhydric alcohols, aliphatic ketones, or a mixture of two or more of aliphatic alcohols, polyhydric alcohols, and aliphatic ketones.

9. A method for manufacturing the zirconia sol according to claim 1, comprising:
a first step of heating an alkali metal solution to 60° C. or more;
a second step of adding ⅓ to ⅔ of a defined addition amount of a zirconium salt solution to the solution obtained in the first step;
a third step of aging the solution obtained in the second step at a predetermined temperature; and
a fourth step of adding the remaining portion of the zirconium salt solution used in the second step to the solution obtained in the third step and producing zirconium hydroxide.

10. The zirconia sol according to claim 1,
wherein the alkali metal M is selected from the group consisting of Li, Na, K, Rb, and Cs.

* * * * *